United States Patent [19]
Long et al.

[11] Patent Number: 4,586,603
[45] Date of Patent: * May 6, 1986

[54] DISK STORAGE CONTAINER AND DISPLAY DEVICE

[75] Inventors: Jerry M. Long, Pleasanton; James A. Womack, Los Gatos, both of Calif.

[73] Assignee: Innovative Concepts, Inc., San Jose, Calif.

[*] Notice: The portion of the term of this patent subsequent to Apr. 2, 2002 has been disclaimed.

[21] Appl. No.: 605,280

[22] Filed: Apr. 30, 1984

Related U.S. Application Data

[63] Continuation-in-part of Ser. No. 322,968, Nov. 19, 1981, Pat. No. 4,508,217.

[51] Int. Cl.⁴ .............................................. B65D 5/50
[52] U.S. Cl. ............................. 206/45.18; 206/444; 206/472; 220/337
[58] Field of Search .................. 206/232, 45.13, 45.18, 206/387, 444, 445, 472, 425; 220/334, 337; 312/9–13, 325

[56] References Cited

U.S. PATENT DOCUMENTS

| 942,148 | 12/1909 | Stark | 312/325 |
|---|---|---|---|
| 1,712,354 | 5/1929 | Miller | 220/334 |
| 3,451,580 | 6/1969 | Husby | 220/337 |
| 3,620,361 | 11/1971 | Fugiwara et al. | 206/387 |
| 3,754,639 | 8/1973 | Gellert | 220/334 |
| 4,211,337 | 7/1980 | Weavers et al. | 220/337 |
| 4,225,038 | 9/1980 | Egly | 206/472 |
| 4,356,918 | 11/1982 | Kahle et al. | 206/387 |
| 4,369,879 | 1/1983 | Egly et al. | 206/472 |
| 4,449,628 | 5/1984 | Egly et al. | 206/472 |

Primary Examiner—George E. Lowrance
Assistant Examiner—Jimmy G. Foster
Attorney, Agent, or Firm—Claude A. S. Hamrick

[57] ABSTRACT

A storage container for floppy disks is comprised of an open top box-like bottom portion, a support arm and a storage pouch which includes an upper part and a lower part. The support arm is pivotally attached to the opposed side walls of said bottom portion at a point adjacent the back wall thereof. The storage pouch is hingedly attached to the support arm at a position near the center of the upper surface thereof, and is secured by guide projections in the guide slots formed along each said side wall. By this arrangement, the rotational movement about the pivotal connection will cause the stored pouch to rise and in so doing, move forward because of the guide slot engagement. At the forward end of the guide slot, is a downwardly extending dog leg that permits the storage pouch to drop down so as to rest on the floor of the base portion. The lower part of pouch is pivotally attached to the upper part and is held in this condition by a detent arrangement. When in the open condition, the lower part can be disengaged and rotated forward. This places the back wall in an inclined condition which facilitates selection and removal of a floppy disk.

5 Claims, 10 Drawing Figures

DISK STORAGE CONTAINER AND DISPLAY DEVICE

BACKGROUND OF THE INVENTION

This is a continuation-in-part of patent application having Ser. No. 06/322,968, and filed in the United States Patent and Trademark Office on Nov. 19, 1981 now U.S. Pat. No. 4,508,217.

FIELD OF THE INVENTION

The present invention relates generally to storage containers for items such as magnetic storage disks of the floppy disk type and more particularly to a storage, container which protects the disk when in a closed condition and which can be opened into a position that provides ready access to the plurality of diskettes stored therein.

DESCRIPTION OF THE PRIOR ART

Magnetic storage disks have increasing use in a variety of applications relating to computers and word processors. The disks are planar and somewhat flexible and thus have acquired the name "floppy disks". Numerous configurations of floppy disk storage containers are provided in the prior art. One such device is illustrated in U.S. Pat. No. 4,225,038 which is a book-like configuration having a pair or overlying covers that are hinged along a side analogous to a binding. One of the covers has a pivotal tray-like insert connected thereto that can be laid within the enclosure formed between the two covers. A slightly different configuration is illustrated in U.S. Pat. No. 3,356,918 in which the container has a base section and pouch section. The pouch section is adapted to be fitted into the base section in a closed position, and the pouch section is adapted to rotate about an axis so that, in an open position, the bottom of the pouch section rests against the bottom of the base section. The pouch section is arranged such that a partial front wall is adpated to pivot about a transverse axis. This enlarges the pouch section, when in the open position and this facilitates insertion and removal of the floppy disks.

While the storage containers disclosed in the above-mentioned patents resolve some of the difficulties attendant with the previous types of storage devices, not all of the problems were resolved. One such is the stability of the container when it is being opened. Without the exercise of proper care, the disks may be easily ejected from their container.

SUMMARY OF THE PRESENT INVENTION

It is an object of the invention to store the disks in a closed container which protects the disks from exposure to dust particles in the air and other adverse elements.

It is another object of the invention to provide a container which may be easily opened.

It is yet another object of the invention to hold the floppy disks in a pouch-like structure which carries the disks into a display position along internal guides, when the container is opened.

Briefly, a preferred embodiment of the invention includes a bottom portion including receptacle forming means for providing a receptacle having a base and side walls extending upwardly from the periphery of said base. A support arm pivotally attached to said upwardly extending side walls and arranged for extending inwardly toward the center of said receptacle. An upper part comprising a first portion hingedly attached to the distal end of said support arm at a point thereon spaced from the upper periphery of said receptacle forming means, and a second portion hingedly attached to said first portion at a point spaced from the attachment of said first support to said receptacle forming means and arranged for rotation between a position common to said first portion and a portion extending away from said first portion. The upper part being arranged for rotation relative to and in cooperation with said support arm between a position within said receptacle forming means and a position extending away from said receptacle forming means; and guide means associated with said receptacle forming means and said upper part for directing movement of said upper part relative to said receptacle forming means between said position within said receptacle forming means and said position extending away from said receptacle forming means.

IN THE DRAWING

DETAILED DESCRIPTION OF THE PREFERRED EMBODIMENTS

Figure 1:
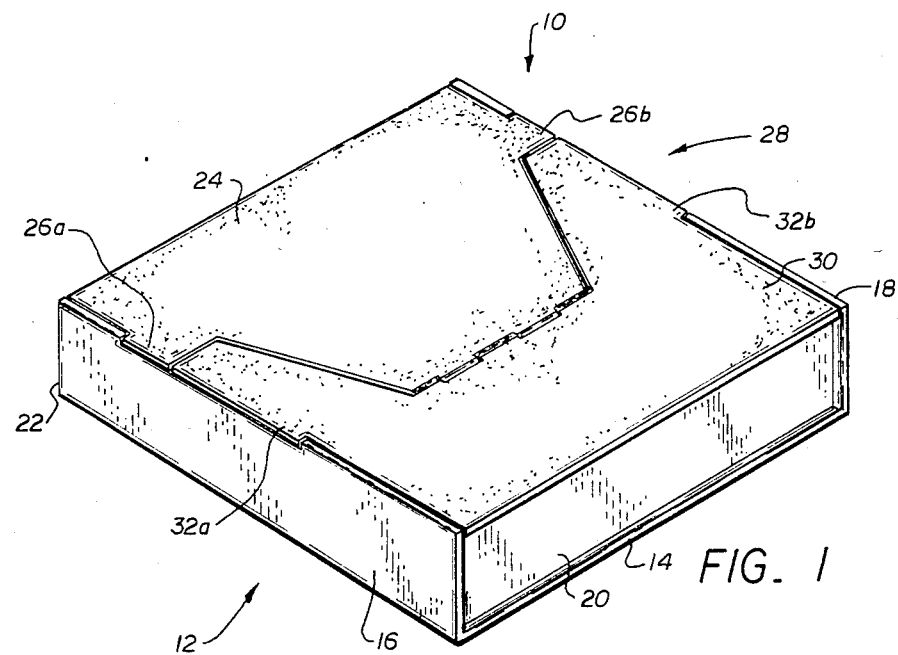
FIG. 1 is an isometric view of the storage container (10) of this invention in a closed condition.

Referring now to FIG. 1 of the drawing, a disk storage container in accordance with the teaching of this invention is shown in its closed condition. It may be seen that storage container 10 includes a bottom portion 12 that comprises a base 14 from which upwardly extending side walls 16 and 18 are formed along with inclined front wall 20 and a rear wall 22. As will be seen later, the inclined front wall 20 is somewhat shorter than the side walls 16 and 18 and the rear wall 22 is considerably shorter than the side walls. The reasons for the differences in the wall heights will become clear later.

A support arm 24 is pivotally attached to the side walls 16 and 18 at a position adjacent the back wall 22 of bottom portion 12. As may be seen the rear outboard portions of the support arm 24 fit inside of the side walls 16 and 18, respectively. The tab portions 26A and 26B fit in a notch formed in the side walls 16 and 18, respectively, and the tabs extend out so as to be flush with the exterior surface of the side walls.

An upper part 28 has a top surface 30 which is substantially rectangular in form and is sized so as to move within the side walls 16 and 18. The exceptions to this are the tabs 32A and 32B which, like the tabs 26A and 26B of the support arm 24, are designed to fit into the notches in the side walls 16 and 18. These tabs provide support in the closed position against undue surface pressure so as to avoid or at least reduce the possibility of damage caused by something being set thereupon. As will be shown later, the forward edge of the upper part 28 includes a grove 31 which mates with the top edge of the inclined front wall 20 so as to provide additional locking in the closed position and to prevent, or at least minimize the entrance of contaminants when the case is closed. The upper part 28 extends forward of the inclined front wall 20 and is substantially in alignment with the side walls 16 and 18, i.e., flush therewith, so as to provide a lip for opening of the storage container. It is to be noted that the inclined front wall 20 is recessed slightly at the juncture with the base 14 and thus also provides a slight gripping surface to facilitate opening of the storage container in a controlled manner.

Figure 2:
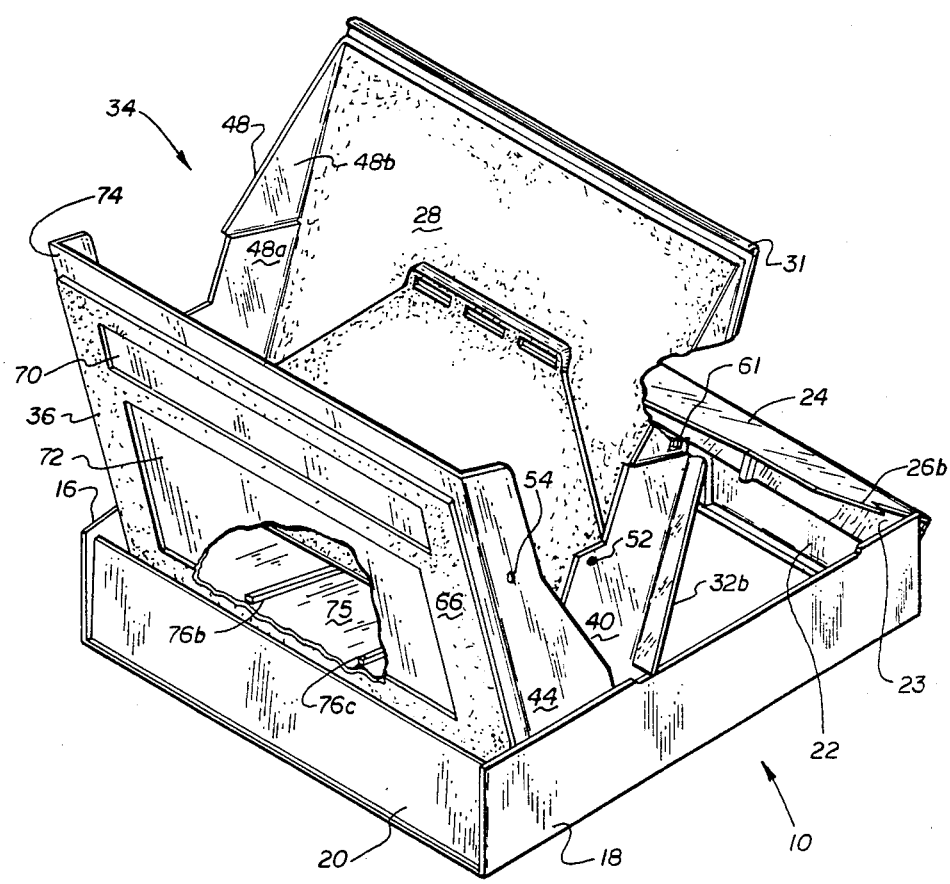
FIG. 2 is a partially broken isometric view of said storage container in the open operating condition.
Figure 4:
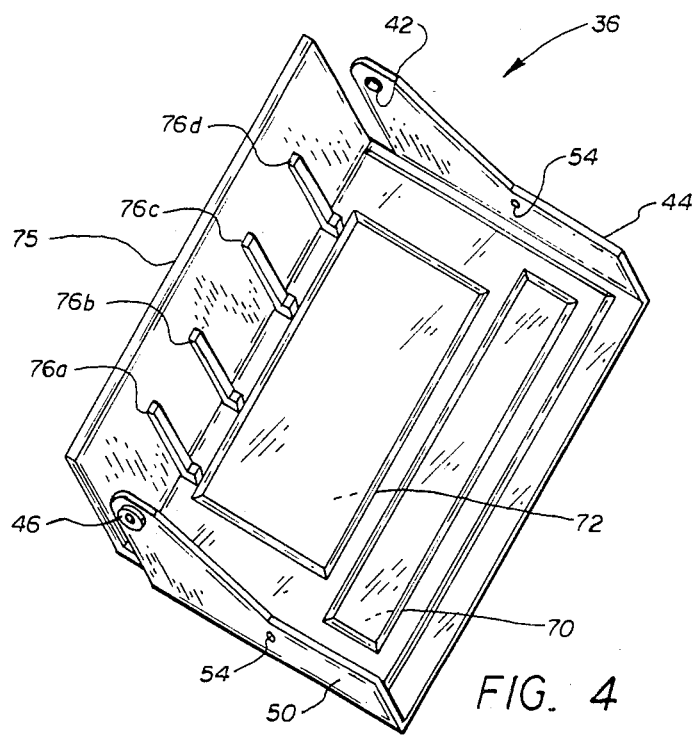
FIG. 4 is an isometric view of the lower part (36) of the pouch portion (34)
Figure 5:
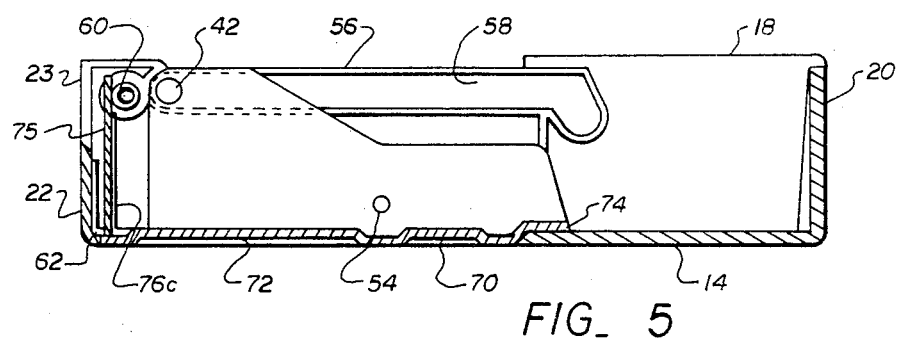
FIG. 5 is an elevational section view of said bottom portion (12) showing how said lower part (36) nestles in the bottom portion in the closed condition.
Figure 6:
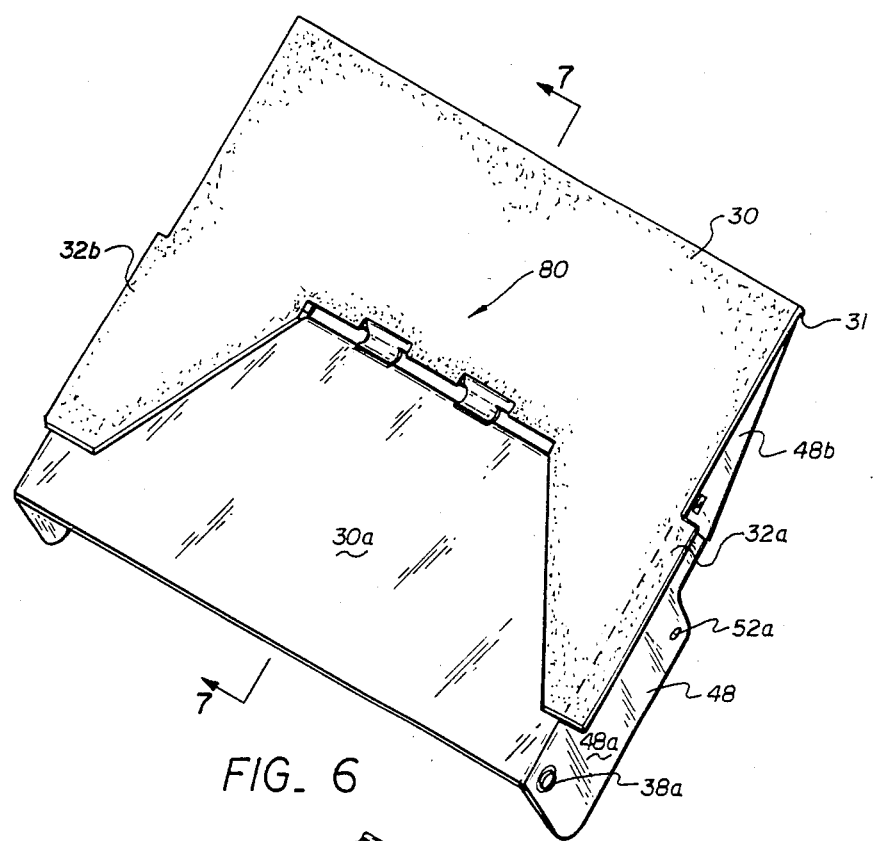
FIG. 6 is an isometric view of the top or cover side of the upper part (28) of said pouch portion (34) and illustrates the connector portion for hinged engagement with a support arm and the recess into which a part of said support arm resides in the closed condition.
Figure 8:
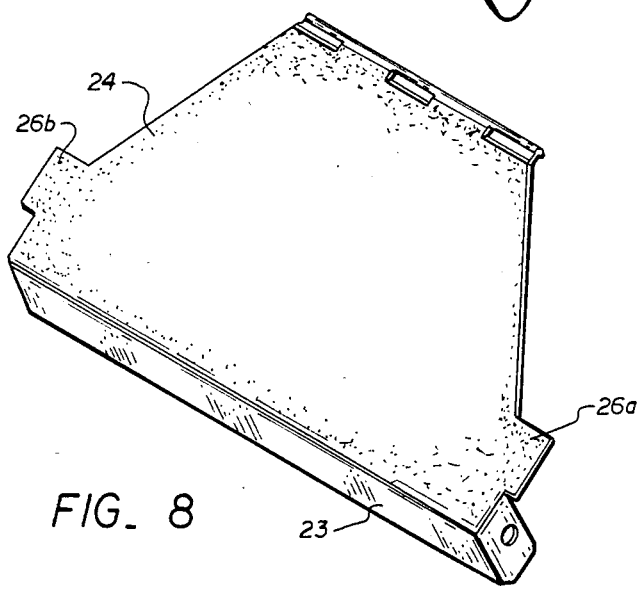
FIG. 8 is an isometric view of said support arm (24)

Referring now to FIG. 2, the storage container may be seen in its open or operating condition. As may be seen, the upper part 28 is inclined with respect to the base and is supported in its position by support arm 24. Additional structural details for upper part 28 are shown in FIG. 6 and additional structural details of lower part 36 are shown in FIG. 4. The upper and lower parts are pivotally joined together near the lower portions thereby by means of pivot projection 38 on side wall 40 and pivot aperture 42 on side wall 44. The pivot aperture 42 is formed centrally within pivot projection 46 as will be discussed later. Corresponding pivot projections and pivot apertures are also formed in side walls 48 and 50, respectively. The bottom portion of side walls of the upper part are formed so as to fit inside of the side walls of the lower part. By rotating the lower part about the pivot points, the upper and lower parts may be brought into correspondence and held in this condition by the mating of detent projection 52 with detent aperture 54. Again, it is to be understood that a corresponding detent projection and detent aperture would be formed in the walls 48 and 50, respectively.

Figure 3:
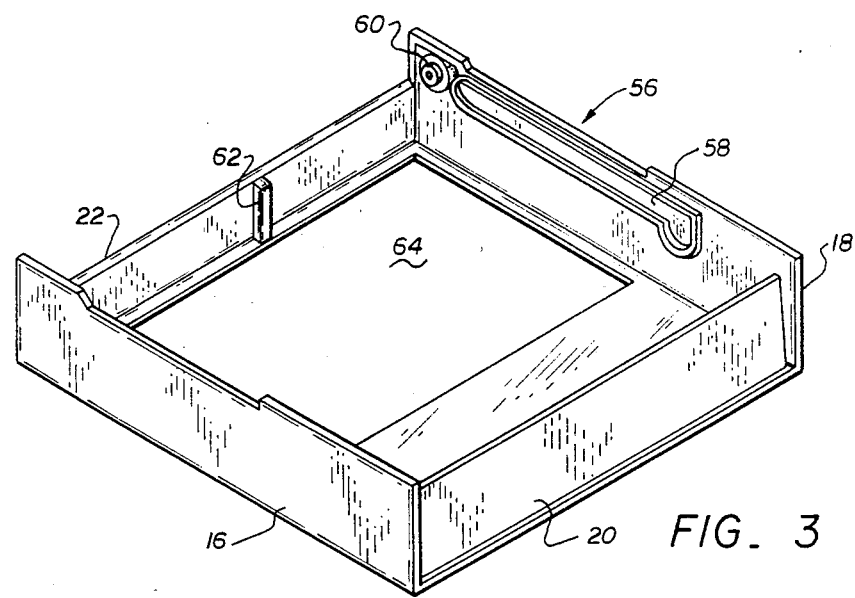
FIG. 3 is an isometric view of the bottom portion (12) of said storage container illustrating the bottom aperture (64), an intergal guide slot (58), a pivot projection (60), the slope of the front wall (20), and a reduced height back wall (22)

Referring now to FIG. 3, some of the features of the bottom portion 12 may be more readily understood. As may be clearly seen, the bottom portion 12 includes a base 14 which has formed thereon upwardly extending side walls 16 and 18, a front wall 20 and a rear wall 22. The front wall 20 is inclined slightly inward and has a height which is lower than that of the side walls by about the thickness of the top cover. Thus, the top surface of the cover is flush with the top edge of the side walls when the container is in a closed condition. As was noted hereinabove, a groove 31 adjacent the front edge of the upper part 28 is adapted to fit over the top edge of front wall 20. The rear wall 22 is reduced in height to accommodate the downwardly extending back wall 23 of the support arm 24. It should be noted that the upper edge of the back wall 22 is sloped downwardly toward the interior of the bottom portion 12 and the back wall 23 of support arm 24 is correspondingly shaped. This facilitates pivotal motion and permits a tighter closure when the storage container is in its closed condition. A notch 56 is formed in each of the side walls 16 and 18, and as was previously noted, the notch accepts the tabs from the support arm 24 and the upper part 28 when in the closed condition. A guide slot 58 is formed in each of the side walls, however, only that of the side wall 18 is illustrated, but it is to be understood that a corresponding guide slot is formed in side wall 16.

The guide slots accept the pivot projections 46 on side walls 44 and 50 of the lower part 36 and the guide slots control the movement of the pouch 34 during opening and closure of the storage container. By this arrangement, a carefully controlled storage container is obtained which avoids the problems incurred with the prior art devices. In particular it avoids the mishandling of the sensitive floppy disk stored in the container.

Also shown in FIG. 3 is a stiffening rib 62 in back wall 22. The aperture 64 in the base 14 is used to accommodate the raised surface 66 on outer wall 68 of lower part 36. Note that the raised portion includes recesses 70 and 72 which are available for the application of identification stickers. This permits a review of the container contents without the need to open the container. At the forward end of wall 68 is a lip 74 which extends toward the front wall and tends to seal the aperture when the storage container is in a closed condition.

To support the floppy disks in the closed or open condition, the lower part 36 includes a back wall 75 which is formed at substantially right angles to the outer wall 68. Ribs 76A, B, C and D provide the necessary support for this cantilevered back wall. Referring again to FIG. 2, it may be seen that when the storage container is in its fully opened condition, i.e., when the lower part 36 is pivoted away from the upper part 28 as shown, the back wall is inclined to the horizontal which causes the disks to be offset thereby facilitating selection and removal.

Figure 7:
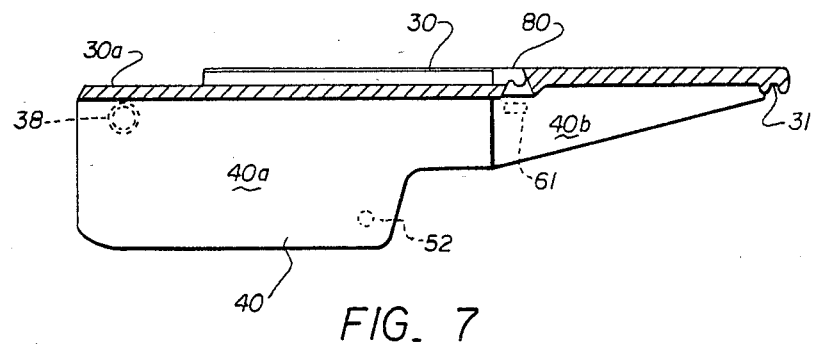
FIG. 7 is an elevational section view along the line 7—7 of FIG. 6.
Figure 9:
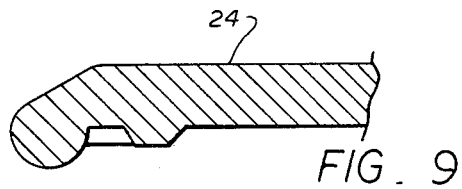
FIG. 9 is an enlarged broken sectional view of the connector portion of said support arm.
Figure 10:
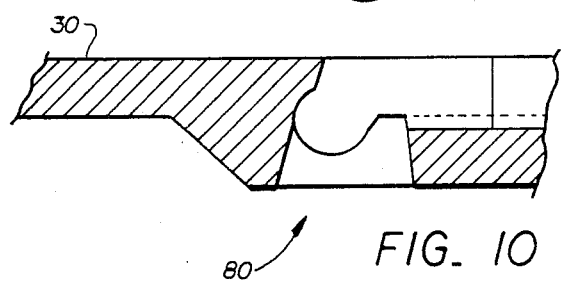
FIG. 10 is an enlarged broken section view of the connector portion of said upper part (28).

Referring now to FIGS. 2, 6 and 7, the construction of the upper part 28 may be more clearly understood. The top cover 30 includes a recessed portion 30A into which the support arm 24 nestles when the container is in the closed condition as shown in FIG. 1. Along the forward portion of the recess is constructed one part of the connector arrangement by which the support arm 24 and the upper part 28 are hingedly engaged. Construction details for the connector arrangement included on support arm 24 and upper part 28 are illustrated in FIGS. 9 and 10 which are enlarged sectional views so as to more clearly illustrate the construction. The forward end of the upper part includes the groove 31 for latching the top cover to the bottom portion by engagment with the upper edge of the inclined front wall 20. A pair of downwardly extending side walls 40 and 48 each include a large part and a substantially triangular section. This is illustrated in FIG. 7 for side wall (40) where the large part is shown as 40A and the triangular section is 40B. As may be seen in FIG. 1, the large part of each side wall is formed so as to closely pass within the upwardly extending sidewalls of said lower part, when the two parts are joined and moved into a closed condition. However, the triangular sections are outwardly offset so as to be in corresponding planes with the side walls of said lower part. Thus, the forward edge of the triangular parts are aligned, respectively, with the adjacent edges of side walls 44 and 50. When the lower part 36 is rotated into alignment with the upper part 28, the detent projection 52 mates with the aperture 54. A corresponding detent projection and detent aperture are found in side walls 48A and 50, respectively, and are also similarly engaged. At this same time, the forward tip of triangular portions 40B and 48B meet, respectively, with the adjacent edge of the side walls 44 and 50 of said lower part 36. This assures that the normal pocket depth of the pouch will be maintained.

A substantially rectangular detent projection 61 is positioned near the base of the triangular portion 40B and is on the outboard side thereof. This projection 61 is positioned so that it is moved into the guide slot 58 when the storage container is in its fully closed position. A corresponding rectangularly shaped detent projection appears on the outboard side wall of side wall 48B and likewise engages the adjacent guide slot. These rectangularly shaped detent projections hold the container in its closed condition regardless of the position in which the container is placed.

As will be clear to those skilled in the art, alterations and modifications may be made to the disclosed embodiment without departing from the inventive concepts thereof. The above description is therefore intended as illustrative and informative but not limiting in scope. Accordingly, it is intended that the following claims be interpreted as covering all such alterations and modifications reasonably fall within the true spirit and scope of the invention.

What is claimed is:

1. A storage and display unit for floppy disks and the like, which comprises:
    a bottom portion including receptacle forming means for providing a receptacle having a floor and walls extending upwardly from the periphery of said floor for providing an open container, said bottom portion including
        a substantially rectangular base the upper surface of which provides said floor;
        a pair of side walls disposed along opposite edges of said base, each said side wall including a support arm pivot projection;
        a front wall which has a slight inward slope from the junction of said base to said top edge which terminates at a height that i lower than said side wall; and
        a back wall that is about one-half height of said side walls;
    a support arm pivotally attached to said upwardly extending walls and arranged for extending inwardly toward the center of said container, said support arm including
        a link member that is substantially flat and includes support tabs and a locking means at the distal end thereof;
        a downwardly extending end wall at the proximal end, said end wall being sized so as to be adjacent the back wall of said bottom portion when the container is closed; and
        a pair of oppositely disposed downwardly extending side wall portions formed with said end wall, each said side wall portion including a pivot aperture to mate with an associated one of said support arm pivot projections, whereby said link member is pivotally attached to said base portion and;
    a storage portion including
        an upper part hingedly attached to the distal end of said support arm at a point thereon spaced from the upper periphery of said receptacle forming means, said upper part including,
        a top surface including a recessed area adapted to accomodate the major part of said link member when said container is in its closed condition, and a locking member adapted to accept said support arm locking means, whereby they are hingedly connected; and a pair of oppositely disposed downwardly extending side walls each of which includes a substantially rectangular section and a substantially triangular section formed therewith, and each side wall including a plurality of detent projections and a pivot projection for pivotal interconnection with said lower part;
        a lower part pivotally connected to said upper part at a point spaced from the attachment of said upper part to said support arm and arranged for rotation between a position common to said upper part and a position extending away said upper part;
        said storage portion being arranged for rotation relative to and in cooperation with said support arm between a position within said receptacle forming means and a position away from said receptacle forming means.

2. A storage and display unit as set forth in claim 1 wherein said lower part comprises:
    a disk support wall;
    a pair of side walls formed along opposite edges of said support wall, each said side wall including at the back end thereof a pivot aperture adapted to accept the pivot projection of said upper part and in an intermediate location a detent aperture adapted to accept one of said plurality of detent projections of said upper part when the storage portion is in a closed condition; and
    a back wall formed with said diskette support wall, said side walls, back wall and said upper part forming a pouch when in the closed condition whereby the disks may be safely stored.

3. A storage and display unit as set forth in claim 2 wherein said top surface includes a pair of oppositely disposed tabs, and each of said pair of side walls of said bottom portion include a notch in the upper edge thereof to accommodate said tabs of said support arm and said top surface, whereby support for said storage portion is maintained when the container is in a closed condition.

4. A storage and display unit as set forth in claim 3 wherein said bottom portion further comprises:
    a guide slot formed on the interior surface of each said side wall, said guide slot having a downwardly extending portion at the front end thereof.

5. A storage and display unit as set forth in claim 4 wherein said lower part further includes a guide projection in each side wall, said guide projection being adapted for movement in said guide slot as the storage portion is moved between open and closed conditions, said downwardly extending guide slot portion operating in conjunction with the guide projections to hold the storage portions in a display position within said base portion.

* * * * *